US007955535B2

(12) United States Patent
Liang et al.

(10) Patent No.: US 7,955,535 B2
(45) Date of Patent: Jun. 7, 2011

(54) METHOD FOR FABRICATING MACROSCALE FILMS COMPRISING MULTIPLE-WALLED NANOTUBES

(75) Inventors: Zhiyong Liang, Tallahasse, FL (US); Ben Wang, Tallahassee, FL (US); Chun Zhang, Tallahassee, FL (US); Chreng-Shii Yeh, Tallahassee, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 602 days.

(21) Appl. No.: 11/670,687

(22) Filed: Feb. 2, 2007

(65) Prior Publication Data
US 2008/0280115 A1    Nov. 13, 2008

Related U.S. Application Data

(60) Provisional application No. 60/764,504, filed on Feb. 2, 2006.

(51) Int. Cl.
*B27N 3/02* (2006.01)
(52) U.S. Cl. ..................... 264/109; 264/122
(58) Field of Classification Search .............. 428/408; 977/742, 840, 842, 844, 938, 963
See application file for complete search history.

(56) References Cited

U.S. PATENT DOCUMENTS

| 6,036,857 | A | 3/2000 | Chen et al. |
|---|---|---|---|
| 6,683,783 | B1 | 1/2004 | Smalley et al. |
| 7,105,596 | B2 | 9/2006 | Smalley et al. |
| 7,459,121 | B2 * | 12/2008 | Liang et al. ............. 264/555 |
| 2002/0150524 | A1 * | 10/2002 | Smalley et al. ............. 422/198 |
| 2005/0154116 | A1 | 7/2005 | Nagy et al. |
| 2005/0239948 | A1 | 10/2005 | Haik et al. |
| 2006/0017191 | A1 | 1/2006 | Liang et al. |
| 2006/0166003 | A1 | 7/2006 | Khabashesku et al. |
| 2006/0207931 | A1 | 9/2006 | Liang et al. |
| 2007/0176319 | A1 | 8/2007 | Thostenson et al. |
| 2008/0057265 | A1 | 3/2008 | Liang et al. |
| 2008/0280115 | A1 | 11/2008 | Liang et al. |

OTHER PUBLICATIONS

Sigma Product Information Sheet for Triton X-100, no date.*
Sigma Product Information Sheet for SDS, no date.*
U. Vohrer, Carbon nanotube sheets for the use as artificial muscles, Carbon, 42, Feb. 6, 2004, p. 1159-1164.*
H. Athalin, A correlated method for quantifying mixed and dispersed carbon nanotubes: analysis of the Raman band intensities and evidence of wavenumber shift, Journal of Raman Spectroscopy, Apr. 1, 2005, 36, p. 400-408.*
S. Iijima, Helical microtubules of graphitic carbon, No month 1991, Nature, 354, p. 56-58.*
Ebbesen et al., Electrical conductivity of individual carbon nanotubes, Jul. 1996, Nature 382, pp. 54-56.*
Odom et al., Atomic structure and electronic properties of single-walled carbon nanotubes, Jan. 1998, Nature 391, pp. 62-64.*
Saito, Dresselhaus and Dresselhaus, Physical properties of carbon nanotubes, No month 1998, Imperial College Press, Chapter 11, pp. 207-209 and 221-224.*
Wikipedia, Title: "Carbon Nanotube," Date: Jan. 9, 2006, pp. 1-7.
Endo, et al., Title: "Buckypaper from Coaxial Nanotubes," Nature/ vol. 433/Feb. 3, 2005/www.nature.com/nature; pp. 476.
Dai, Title: "Carbon Nanotubes Opportunities and Challenges," Surface Science 500 (2002), pp. 218-241, Mar. 10, 2002.
Gou, et al., Title: "Development of Nanotube Bucky Paper/Epoxy Nanocomposites," Proceedings of the TEXCOMP-6 International Symposium on Textile Composites, Sep. 11-13, 2002, pp. 1-5.
Wang, et al., Title: "Fabrication and Characterization of In-Plane Aligned Nanotube Composites with Magnetically Aligned Carbon Nanotube Bucky Papers," Proc. 14th Int. Conf. on Composite Materials (ICCM-14), 1 (San Diego, CA , Jul. 14-18),—(2003) pp. 1-7.
Gou, et al., Title: "Process Analysis and optimization of SWNT Bucky Paper Reinforce Epoxy Composites," Proceedings of the 48th International Society for Advancement of Material Process Engineering (SAMPE) Symposium and Exhibition, Long Beach, CA May 12-14, 2003, pp. 1-12.
Ajayan, et al., "Aligned Carbon Nanotube Arrays Formed by Cutting a Polymer Resin-Nanotube Composite", Science, vol. 265, pp. 1212-1214, Aug. 26, 1994.
Ajayan, et al., "Single-Walled Carbon Nanotube-Polymer Composites: Strength and Weakness," Advanced Materials 12:750-753 (2000).
Andrews, et al., "Nanotube composite carbon fibers", Applied Physics Letters, 75(9): pp. 1329-1331, Aug. 30, 1999.
Chauvet, et al., "Magnetic anisotropies of aligned carbon nanotubes", The American Physical Society, 52(10): pp. 6963-6966, Sep. 1, 1995.
Chen, et al., "Electrochemical synthesis of polypyrrole/carbon nanotube nanoscale composites using well-aligned carbon nanotube arrays", Applied Physics A, vol. 73, pp. 129-131, Jun. 20, 2001.
Cooper, et al., "Distribution and Alignment of Carbon Nanotubes and Nanofibrils in a Polymer Matrix," Composites Science and Technology 62:1105-1112 (2002).
de Heer, et al., "Aligned Carbon Nanotube Films: Production and Optical and Electronic Properties," Science 268:845-847, May 12, 1995.
Dresselhaus, et al., "Graphite Fiber and Filament," M. Cardon, Ed., pp. 12-34 (1988).
Fan, et al., "Self-Oriented Regular Arrays of Carbon Nanotubes and Their Field Emission Properties," Science 283:512-514, Jan. 22, 1999.

(Continued)

Primary Examiner — Timothy M Speer
(74) Attorney, Agent, or Firm — Sutherland Asbill & Brennan LLP

(57) ABSTRACT

A technique is provided for the fabrication of multi-walled carbon nanotube (MWNT) and carbon nanofiber (CNF) film materials. The method includes mixing a relatively small amount of single-walled nanotubes (SWNTs) with larger amounts of MWNTs and CNFs, which enables one to produce highly flexible SWNT materials—advantageously without the need for bonding agents and at significantly lower costs compared to flexible SWNT materials. The method exploits SWNTs tendency to entangle together to form flexible films, using a small amount of SWNTs to wrap around and entangle the larger diameter MWNTs and CNFs together to form flexible films with highly beneficial mechanical, electrical, and thermal properties at a fraction of the cost of SWNT materials.

17 Claims, 4 Drawing Sheets

OTHER PUBLICATIONS

Fujiwara, et al., "Magnetic Orientation and Magnetic Properties of a Single Carbon Nanotube", The Journal of Physical Chemistry, 105(18): pp. 4383-4386, May 10, 2001.

Garg, et al., "Effect of chemical functionalization on the mechanical properties of carbon nanotubes", Chemical Physics Letters, 295(4): pp. 273-278. Abstract, Oct. 16, 1998.

Gou, et al., "Experimental Design and Optimization of Dispersion Process for Single-Walled Carbon Nanotube Bucky Paper," International Journal of Nansciencel, 3(3), 293-307, (2004).

Hertel, et al., "Deformation of Carbon Nanotubes by Surface van der Waals Forces," Physical Review B. 58:13870-13873, Nov. 15, 1998.

Holloway, et al., "Texture Development Due to Preferential Grain Growth of Ho-Ba-Cu-O in 1.6-T Magnetic Field," J. Mat. Res. 8:727-733, Apr. 1993.

Knez, et al., "Electrochemical modification of individual nano-objects", Journal of Electroanalytical Chemistry, vol. 522: pp. 70-74 (2002).

Kumar, et al., "Fibers from Polypropylene/Nano Carbon Fiber Composites," Polymer 43:1701-1703 (2002).

Kyotani, et al., "Preparation of Ultrafine Carbon Tubes in Nanochannels of an Anodic Aluminum Oxide Film," Chem. Mater. 8:2109-2113 (1996).

Li, et al., "Large-Scale Synthesis of Aligned Carbon Nanotubes," Science 274:1701-1703, Dec. 6, 1996.

Lourie, et al., "Evaluation of Young's modulus of carbon nanotubes by micro-Raman spectroscopy", Journal of Materials Research, 13(9): pp. 2418-2422, Sep. 1998.

Ni, et al., "Chemical Functionalization of Carbon Nanotubes through Energetic Radical Collisions," Physical Review B. 61:R16343-R16346, Jun. 15, 2000.

Qian, et al., "Load transfer and deformation mechanisms in carbon nanotube-polystyrene composites", Applied Physics Letters, 76(20): pp. 2868-2870, May 15, 2000.

Smith, et al., "Structural anisotropy of magnetically aligned single wall carbon nanotube films", Applied Physics Letters, 77(5): pp. 663-665, Jul. 31, 2000.

Stéphan, et al., "Characterization of singlewalled carbon nanotubes—PMMA composites", Synthetic Metals, 108(2): pp. 139-149. Abstract, Jan. 17, 2000.

Thostenson, et al., "Nanocomposites in context," Composites Science and Technology 65: 491-516 (2005), Dec. 10, 2004.

Treacy, et al., "Exceptionally High Young's Modulus Observed for Individual Carbon Nanotubes," Nature 381:678-680, Jun. 20, 1996.

Velasco-Santos, et al., "Chemical Functionalization of Carbon Nanotubes through an Organosilane," Nanotechnology 13:495-498 (2000), Aug. 2002.

Wang, et al., "Growth and characterization of buckybundles", Applied Physics Letters, 62(16): pp. 1881-1883, Apr. 19, 1993.

Wood, et al., "Orientation of Carbon Nanotubes in Polymers and its Detection by Raman Spectroscopy," Composites: Part A 32:391-399 (2001).

Velasco-Santos, et al., "Chemical functionalization of carbon nanotubes through an organosilane", Nanotechnology, vol. 13, pp. 495-498. Abstract, Jul. 3, 2002.

Liang, et al., "Molecular Dynamic Simulation and Experimental Investigation of Filling Chopped SWNTS with Resin Matrix Molecules to Enhance Interfacial Bonding and Loading Transfer in Nanocomposites," SAMPE 2004, Long Beach, CA, May 16-24, 2004, pp. 1-8.

U.S. Appl. No. 11/459,171, filed Jul. 21, 2006, Wang, et al.

U.S. Appl. No. 11/749,302, filed May 16, 2007, Liang, et al.

Cho, et al., "Carbon nanotube synthesis using a magnetic field via thermal chemical vapor deposition," Journal of Crystal Growth 243, 2002, pp. 224-229.

Haggenmueller, et al., "Aligned single-wall carbon nanotubes in composites by melt processing methods," Chemical Physics Letters 330, Nov. 10, 2000, pp. 219-225.

Kimura, et al., "Polymer Composites of Carbon Nanotubes Aligned by a Magnetic Field," Advanced Materials, v14 No. 19, Oct. 2, 2002, pp. 1380-1383.

Thostenson, et al., "Advances in the science and technology of carbon nanotubes and their composites: a review," Composites Science and Technology 61, 2001, pp. 1899-1912.

Wu, et al., "Deposition of Nanotube Composites using Matrix-Assisted Pulsed Laser Evaporation," Materials Research Society Symposium, vol. 617, 2000, pp. J2.3.1-6.

* cited by examiner

METHOD FOR FABRICATING MACROSCALE FILMS COMPRISING MULTIPLE-WALLED NANOTUBES

CROSS-REFERENCE TO RELATED APPLICATIONS

This application claims benefit of U.S. Provisional Application No. 60/764,504, filed Feb. 2, 2006. The application is incorporated herein by reference.

BACKGROUND OF THE INVENTION

This invention relates generally to carbon nanotubes and nanofibers, and more particularly to methods for fabricating multiple-walled carbon nanotube and carbon nanofiber film materials.

Carbon nanotubes are cylindrical carbon molecules and exhibit numerous useful properties, including exceptional mechanical strength, unique electrical properties, and efficient thermal conductors. Such properties are desirable in many applications, including nano-electronics, optics, and materials of construction applications. More specifically, the exceptional qualities of carbon nanotubes are desirable in the development of multifunctional and smart composites and for use in variety of instruments, sensors, and other devices.

There are primarily two categories of nanotubes: single-walled nanotube (SWNT) and multiple-walled carbon nanotube (MWNT) materials. SWNTs typically have small diameters (~1-5 nm) and large aspect ratios, while MWNTs typically have large diameters (~5-200 nm) and small aspect ratios. Another type of nanoscale material is a carbon nanofiber (CNF) material. CNFs are filamentous fibers resembling whiskers of multiple graphite sheets.

One significant advantage that MWNTs and CNFs have over SWNTs is that the fabrication of MWNT and CNF materials costs substantially less than the fabrication of SWNTs. For example, the fabrication of MWNT and CNF may cost approximately $10-20 per gram and $50-120 per pound, respectively, while the fabrication of SWNT may cost approximately $250-1,000 per gram.

However, despite their cost advantage, MWNTs and CNFs alone are difficult to form into sizeable and flexible film materials using current techniques due to their relatively large diameter, small aspect ratios, and stiffness. NanoLab (Newton, Mass.) has demonstrated the feasibility of making small-diameter MWNT (~1 inch to 5 inch) material films through suspension and filtration of MWNT suspensions. Shinshu University, Japan, also demonstrated the possibility of making buckypapers from pure small diameter, double-walled nanotubes (DWNTs) (see Endo et al., Nature, 433:476 (February 2005)). However, the manufacturability of making large and flexible MWNT films has not been demonstrated. Other techniques for making MWNT and CNF material films generally require chemical bonders or agents. The use of chemical bonding agents, however, is undesirable due to the difficulty of eliminating the residual chemicals from MWNT and CNF films. The residual chemical bonding agents may also detrimentally affect the material properties of the resulting films. For instance, the residual agents may reduce the permeability and electrical conductivity of the CNF film.

It therefore would be desirable to provide improved methods for fabricating MWNT and CNF material films, including such methods that do not require use of chemical bonding agents. It also would be desirable to provide more useful MWNT and CNF material films, such as ones that are relatively flexible.

SUMMARY OF THE INVENTION

Methods for making macroscale films and improved macroscale films are provided. In one aspect, the method includes the steps of (a) forming a suspension which comprises a mixture of (i) single wall nanotubes (SWNTs) and (ii) multiwall nanotubes (MWNTs) or carbon nanofibers (CNFs), or both MWNTs and CNFs, dispersed in a liquid; and then (b) removing the liquid to form a macroscale film which comprises MWNTs, CNFs, or a combination thereof, interspersed with SWNTs. In one embodiment, the weight ratio of SWNT to MWNT, CNF, or combination thereof, in the suspension may be between about 1:20 and about 1:1. The step of removing the liquid may comprise a filtration process to separate the liquid from the MWNTs, CNFs, or combination thereof, and SWNTs. The step of removing the liquid may alternatively or in addition comprise vaporization of at least a portion of the liquid.

The liquid portion of the suspension may comprise a volatile organic liquid, such as acetone, ethanol, methanol, n-hexane, or a combination thereof. In addition or in the alternative, the liquid may comprise water. The liquid optionally may include a surfactant, such as a non-ionic surfactant.

The method may be carrying out in a manner to align the MWNTs, CNFs, or combination thereof, in the suspension, and then maintain that alignment into the macroscale film. The alignment may be done magnetically.

In another aspect, a method is provided for making a macroscale film that includes the steps of (a) forming a suspension which comprises (i) small diameter MWNTs and (ii) large diameter MWNTs, large diameter CNFs, or a combination of large diameter MWNTs and large diameter CNFs, dispersed in a liquid; and then removing the liquid to form a macroscale film which comprises large diameter MWNTs, large diameter CNFs, or a combination thereof, interspersed with small diameter MWNTs. The small diameter MWNTs may comprise double-walled nanotubes. The step of removing the liquid may comprise a filtration process, vaporization of at least a portion of the liquid, or a combination thereof.

In still another aspect, flexible macroscale films are provided, which may be made by the foregoing methods. The film may comprise MWNTs or CNFs entangled with SWNTs. In one embodiment, the macroscale film includes MWNTs, CNFs, or a mixture thereof; and SWNTs entangled among the MWNTs, CNFs, or mixture thereof, wherein the film is between 5 wt % and 50 wt % SWNTs. In another embodiment, the macroscale film includes large diameter MWNTs, large diameter CNFs, or a mixture thereof; and small diameter MWNTs entangled among the large diameter MWNTs, large diameter CNFs, or mixture thereof, wherein the film is between 5 wt % and 50 wt % small diameter MWNTs.

DETAILED DESCRIPTION OF THE INVENTION

New methods have been developed for fabricating flexible macroscale film materials by exploiting SWNTs tendency to entangle together to form macroscale films, using a small amount of SWNTs to wrap around and entangle the larger diameter MWNTs and CNFs together to form films with highly beneficial mechanical, electrical, and thermal properties at a fraction of the cost of SWNT materials—advantageously without the addition of chemical bonders or agents.

Figure 1:
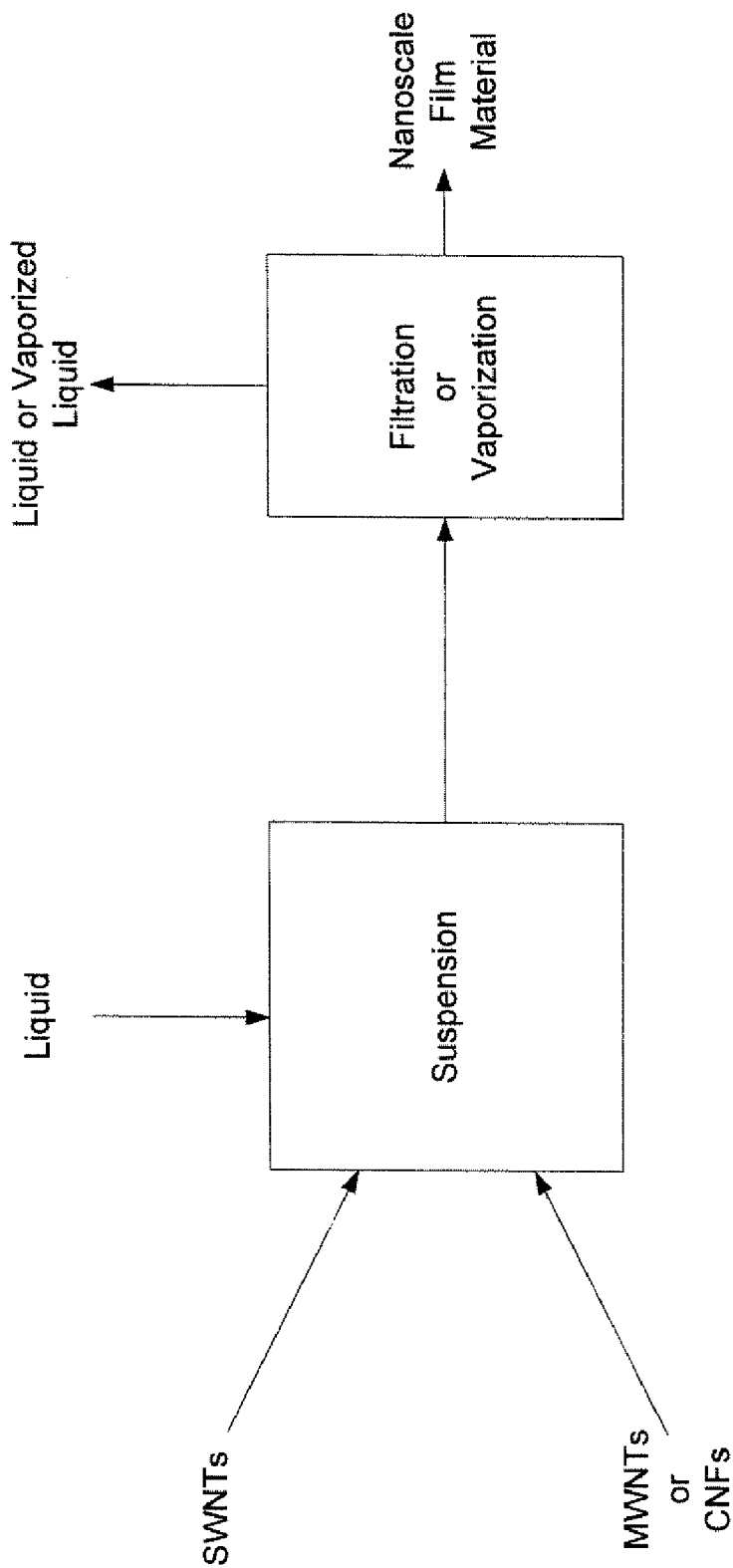
FIG. 1 is a process flow diagram of one embodiment of a process for making macroscale film materials as described herein.

In a preferred embodiment, the method of fabricating macroscale film material comprises suspending SWNTs together with MWNTs and/or CNF in a non-solvent and then filtering or vaporizing the suspension to remove the non-solvent and thereby form the MWNT or CNF film material in which the SWNTs entangle the MWNTs or CNFs. FIG. 1 is a process flow diagram illustrating the methods.

As described above, the large diameters and small aspect ratios of the MWNTs and CNFs make it difficult to form a flexible film material solely of these materials without the addition of a chemical bonding agent. Conversely, the small diameters and large aspect ratios of SWNT make it relatively easy to form a flexible film material, without the use of a chemical bonding agent, due to intensive entanglement of the SWNTs. The SWNTs are interspersed among and wrap around the MWNTs or CNFs. Therefore, it has now been discovered that one may create a macroscale film material combining SWNTs and MWNTs or CNFs to obtain the advantages of both materials and negate their disadvantages: obtaining flexibility without chemical bonding agents and avoiding the high cost associated with the use of 100% SWNTs in the macroscale film. Furthermore, intimate contact between the SWNTs and the MWNTs or CNFs, which can provide high electrical and thermal conducting, is achieved by the SWNT wrapping effect in the materials.

As used herein, the terms "carbon nanotube" and the shorthand "nanotube" refer to carbon fullerene, a synthetic graphite, which typically has a molecular weight between about 840 and greater than 10 million. Carbon nanotubes are commercially available, for example, from Carbon Nanotechnologies, Inc. (Houston, Tex. USA), or can be made using techniques known in the art.

In a preferred embodiment, the method of fabricating the macroscale film material comprises the steps of (1) dispersing an amount of MWNT's, CNFs, or both MWNTs and CNFs, with an amount of SWNTs in a liquid to form a suspension (wherein the nanotubes separate into individuals or small bundles and float in the non-solvent due to the nanotubes' large surface area and strong molecular interactions); and then (2) filtering the suspension to remove the liquid, to yield a film that includes MWNTs, CNFs, or both MWNTs and CNFs, with SWNTs interspersed therethrough. In another embodiment, step (2) utilizes vaporization of the liquid to remove the liquid and form the film. It is possible to use a combination of filtration and evaporation, either sequentially or simultaneously. The vaporization or filtration process may include the addition of heat, a pressure reduction, or a combination thereof.

The liquid is a nonsolvent. As used herein, the term "nonsolvent" refers to any liquid media that essentially are non-reactive with the nanotubes and in which the nanotubes are virtually insoluble. Examples of suitable nonsolvent liquid media include water and volatile organic liquids, such as acetone, ethanol, methanol, and n-hexane. The liquid may be an aqueous solution, and may be an aqueous-organic liquid mixture. Low-boiling point nonsolvents are typically preferred so that the nonsolvent can be easily and quickly removed from the matrix material. The liquid optionally may include a surfactant (such as a non-ionic surfactant, e.g., Triton X-100, Fisher Scientific Company, NJ) to enhance dispersion and suspension stabilization. The surfactant is removed along with the rest of the liquid in the filtration or volatilization step.

The amount of MWNTs, CNFs, or both MWNTs and CNFs, (collectively referred to herein as MWNTs) relative to the amount of SWNTs in the suspension (and thus in the resultant film) can be varied depending upon the desired properties of the macroscale film. In preferred embodiments, the weight ratio of SWNTs to MWNTs is between about 1:20 and about 1:1. In one embodiment, the weight ratio of SWNTs to MWNTs is 1:3. Desirably, the SWNTs are well mixed in the suspension, to provide high content uniformity.

Figure 2:
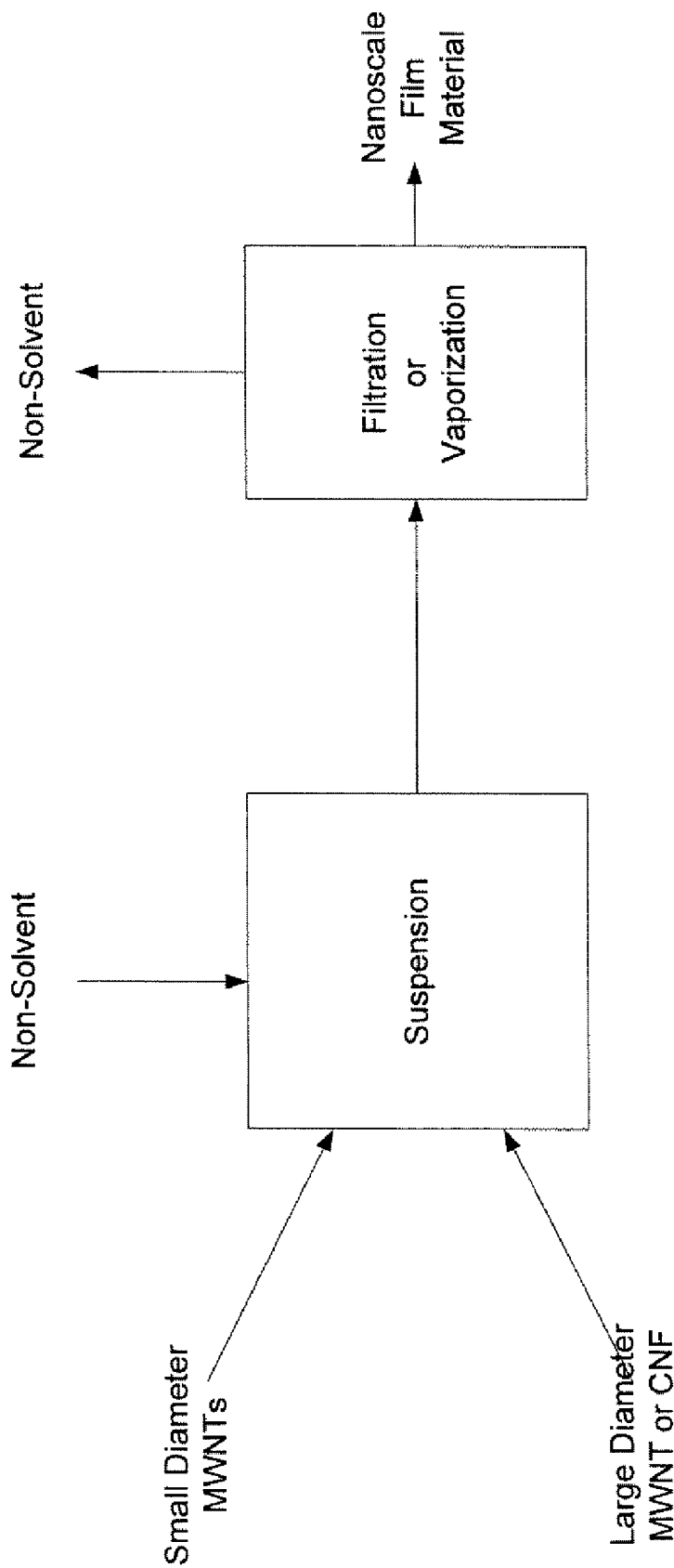
FIG. 2 is a process flow diagram of another embodiment of a process for making macroscale film materials as described herein.

In an alternative embodiment, small diameter MWNTs (such as small diameter DWNTs) may be used to replace SWNTs to produce MWNTs(small diameter)/MWNTs(large diameter) or MWNTs(small diameter)/CNFs films. As used herein, the term "small diameter MWNT" refers to multiwall nanotubes having a diameter of 10 nm or less, and the term "large diameter MWNT" refers to multiwall nanotubes having a diameter of more than 10 nm. Likewise, the term "large diameter CNF" refers to carbon nanofibers having a diameter of 10 nm or more. FIG. 2 is a process flow diagram illustrating the method.

The SWNTs, DWNTs, MWNTs and CNFs may be chemical modified or coated with other materials to impart various functionalities the macroscale films made as described herein.

In one embodiment, the fabrication method further includes aligning the nanotubes in the macroscale film. The liquid removal may be performed follow alignment of the nanotubes in the suspension, such that the alignment is substantially maintained after the liquid is removed. In one embodiment, this alignment may be performed using in situ filtration of the SWNT/suspensions in high strength magnetic fields, as described for example, in U.S. Patent Application Publication No. 2005/0239948 to Haik et al., which is incorporated herein by reference.

In another aspect, flexible macroscale films are provided, which films comprise multiwall nanotubes and/or carbon nanofibers entangles with a small amount of single wall nanotubes. In one embodiment, a macroscale film is provided that includes MWNTs, CNFs, or a mixture thereof; and SWNTs entangled among the MWNTs, CNFs, or mixture thereof, wherein the film is between 5 wt % and 50 wt % SWNTs. In another embodiment, a macroscale film is provided that includes large diameter MWNTs, large diameter CNFs, or a mixture thereof, and small diameter MWNTs entangled among the large diameter MWNTs, large diameter CNFs, or mixture thereof wherein the film is between 5 wt % and 50 wt % small diameter MWNTs. The film is macroscale, so it is of sufficiently large length and width dimensions to be useful in a number of practical applications.

The macroscale films described herein can be used in a variety of applications. For example, the macroscale films may be used in applications requiring highly pure materials or in applications needing porous nanofilms. The flexible macroscale film also facilitates case of handling and may provide an economical and effective method for incorporating the nanoscale materials into composite materials having a host of uses. Examples of possible uses include composite materials such as high strength, lightweight, structural members (e.g., for automotive body parts, athletic equipment, spacecraft), nanoelectronics, fuel cells (e.g., for the storage of hydrogen), and optical equipment and video displays (e.g., field emission displays). Nanotube-metal matrix materials can be used to make extremely strong structural materials for aircraft and spacecraft and for long power-transmission lines and suspension bridges.

The present invention is further illustrated by the following non-limiting examples.

Example 1

Figure 3:
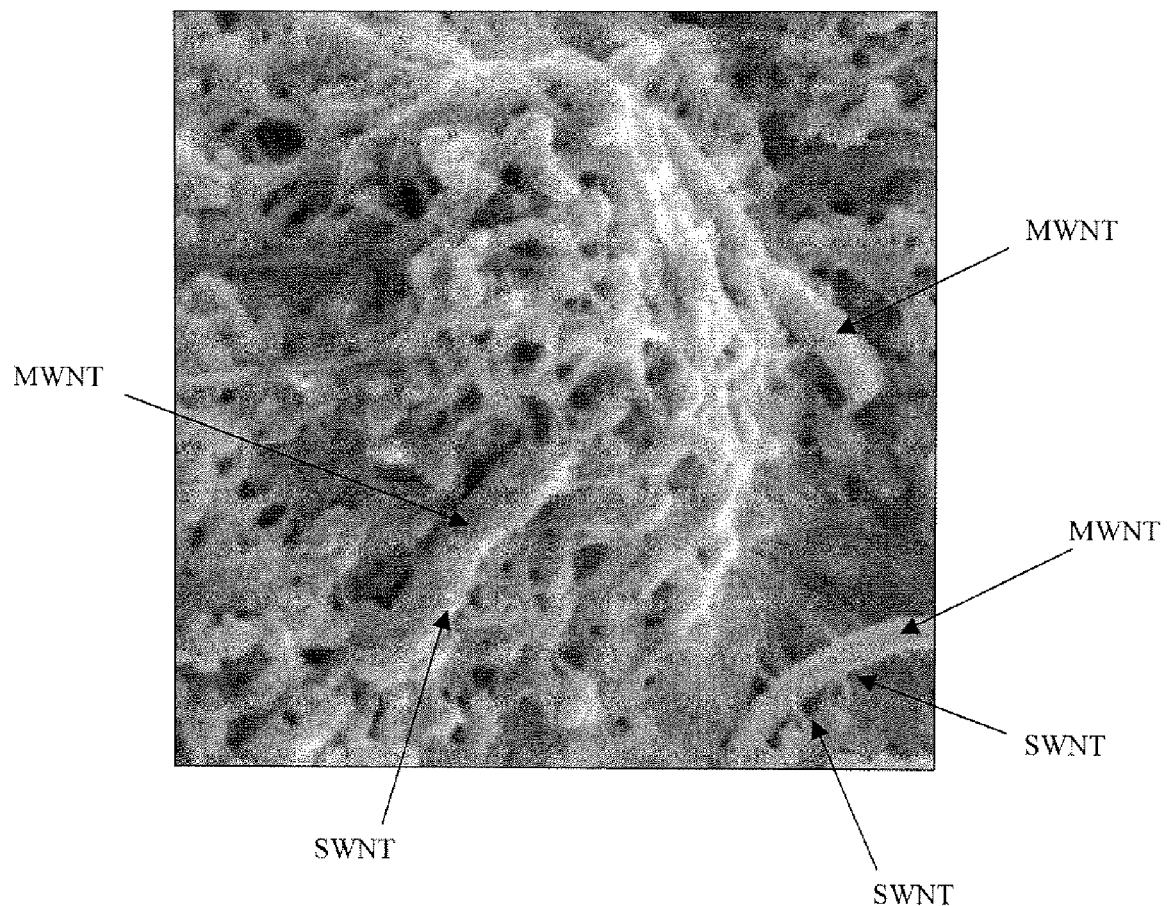
FIG. 3 is an electron micrograph of a macroscale film of SWNTs and MWNTs made by a method described herein.

Fabrication of Flexible Macroscale Film of SWNTs and MWNTs Without Chemical Bonding Agent A flexible macroscale film was made by dispersing SWNTs and MWNTs (SWNTs/MWNTs at a 1:3 weight ratio) in an aqueous solution to form a suspension and then filtering the suspension to remove the aqueous solution and form the film. The film was approximately 9 inches by 9 inches square. FIG. 3 is an electron micrograph of the film, showing the interspersed SWNTs wrapped around large diameter MWNTs.

Example 2

Figure 4:
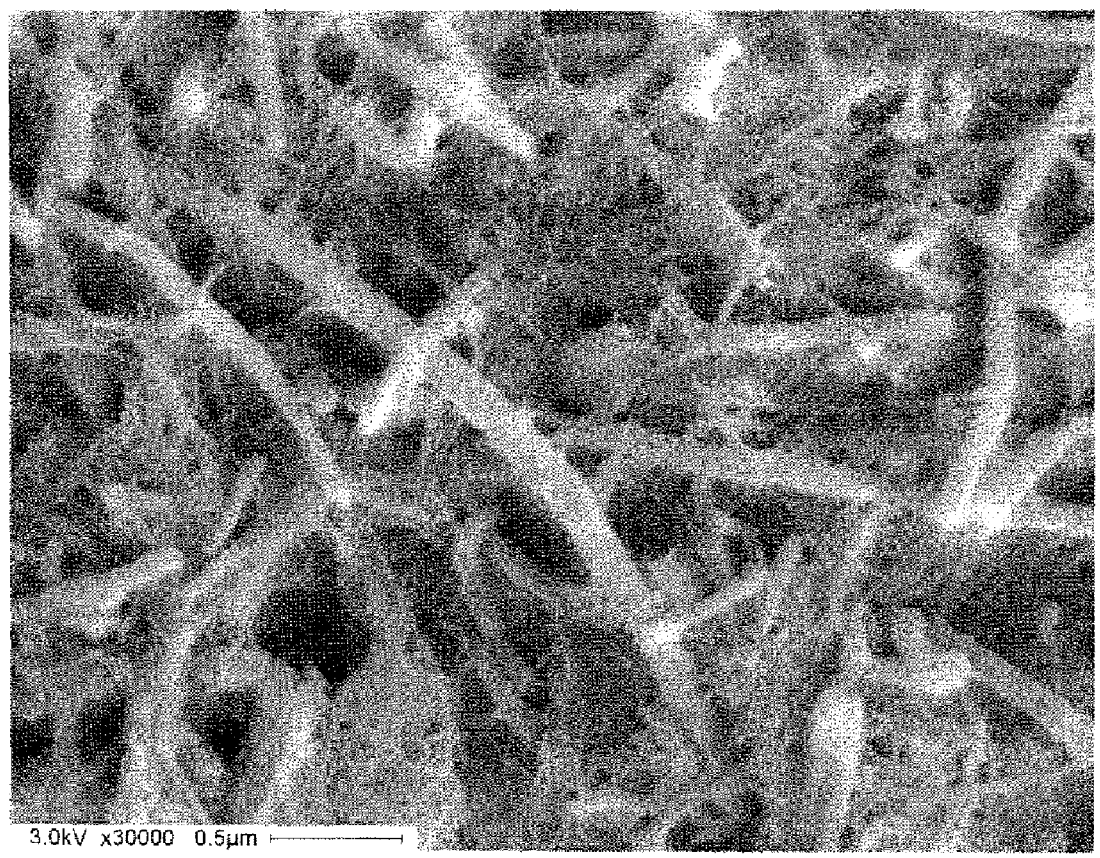
FIG. 4 is an electron micrograph of a macroscale film of SWNTs and CNFs made by a method described herein.

Fabrication of Flexible Macroscale Film of SWNTs and CNFs Without Chemical Bonding Agent A flexible macroscale film was made by dispersing SWNTs and CNFs (SWNTs/CNFs at a 1:3 weight ratio) in an aqueous solution to form a suspension and then filtering the suspension to remove the aqueous solution and form the film. The film was approximately 9 inches by 9 inches square. FIG. 4 is an electron micrograph of the film, showing the interspersed SWNTs wrapped around large diameter CNFs.

Modifications and variations of the methods and devices described herein will be obvious to those skilled in the art from the foregoing detailed description. Such modifications and variations are intended to come within the scope of the appended claims.

We claim:

1. A method for making a macroscale film, comprising the steps of:
   forming a suspension which comprises a mixture of (i) single wall nanotubes (SWNTs) and (ii) multiwall nanotubes (MWNTs) or carbon nanofibers (CNFs), or both MWNTs and CNFs, dispersed in a liquid, wherein the weight ratio of SWNTs to MWNTs, CNFs, or both MWNTs and CNFs in the suspension is 1:3; and
   removing the liquid to form a macroscale film which comprises MWNTs, CNFs or a combination thereof, interspersed with SWNTs.

2. The method of claim 1, wherein the step of removing the liquid comprises a filtration process to separate the liquid from the MWNTs, CNFs, or combination thereof, and SWNTs.

3. The method of claim 1, wherein the step of removing the liquid comprises vaporization of at least a portion of the liquid.

4. The method of claim 1, wherein the step of removing the liquid comprises a combination of filtration and vaporization of the liquid.

5. The method of claim 1, wherein the liquid comprises a volatile organic liquid.

6. The method of claim 5, wherein the volatile organic liquid is selected from the group consisting of acetone, ethanol, methanol, n-hexane, and combinations thereof.

7. The method of claim 1, wherein the liquid comprises water.

8. The method of claim 1, wherein the liquid comprises a surfactant.

9. The method of claim 8, wherein the surfactant comprises a non-ionic surfactant.

10. The method of claim 1, further comprising magnetically aligning the MWNTs, CNFs, or combination thereof in the suspension.

11. A method for making a macroscale film, comprising the steps of:
    forming a suspension which comprises (i) small diameter MWNTs and (ii) large diameter MWNTs, large diameter CNFs, or a combination of large diameter MWNTs and large diameter CNFs, dispersed in a liquid; and
    removing the liquid to form a macroscale film which comprises large diameter MWNTs, large diameter CNFs, or a combination thereof, interspersed with small diameter MWNTs.

12. The method of claim 11, wherein the small diameter MWNTs comprise double-walled nanotubes.

13. The method of claim 11, wherein the step of removing the liquid comprises a filtration process.

14. The method of claim 11, wherein the step of removing the liquid comprises vaporization of at least a portion of the liquid.

15. The method of claim 11, wherein the step of removing the liquid comprises a combination of filtration and vaporization of the liquid.

16. The method of claim 11, wherein the liquid comprises a volatile organic liquid.

17. The method of claim 11, wherein the film is between 5 wt % and 50 wt % small diameter MWNTs.

* * * * *